(No Model.)

W. S. SMITH.
WAGON BRAKE.

No. 313,115. Patented Mar. 3, 1885.

ATTEST-
J. Henry Kaiser
Geo. T. Smallwood

INVENTOR-
Warren S. Smith,
By David H. Mead.
Attorney.

UNITED STATES PATENT OFFICE.

WARREN S. SMITH, OF HAINESBURG, NEW JERSEY.

WAGON-BRAKE.

SPECIFICATION forming part of Letters Patent No. 313,115, dated March 3, 1885.

Application filed March 31, 1884. (No model.)

*To all whom it may concern:*

Be it known that I, WARREN S. SMITH, a citizen of the United States, residing at Hainesburg, New Jersey, have invented new and useful Improvements in Wagon-Brakes, of which the following is a specification.

My invention relates to certain new and useful improvements in wagon-brakes.

The object of the invention is to produce a brake which shall be automatically secured in a locked position when the operating-lever is released after being raised to bring the brake-shoes into contact with the wheels, and which shall also be capable of being automatically released from the locked position by slightly raising the handle when the brake is in contact with the wheels.

With these objects in view my invention consists of a lever provided with a pawl adapted to engage with a ratchet-plate secured in any suitable position, and in the various novel details of construction, hereinafter described, whereby the lever is automatically secured in a locked position and the pawl automatically released.

In order that those skilled in the art to which my invention appertains may know how to make and use my improved brake, I will now proceed to describe the same, in connection with the accompanying drawings, in which—

Figure 1:
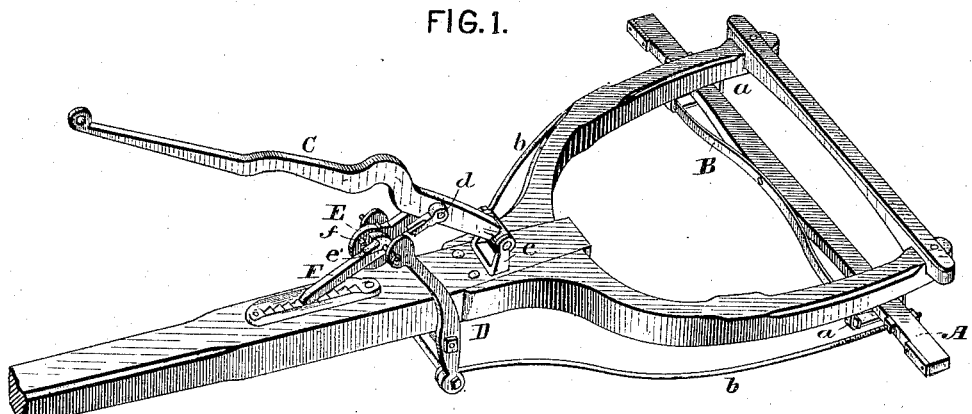
Figure 2:
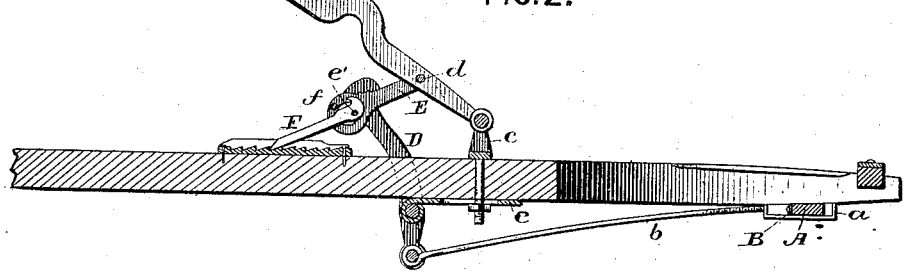
Figure 3:
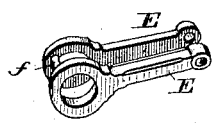
Figure 4:
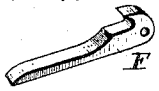

Figure 1 is a perspective view of the entire brake. Fig. 2 is a central longitudinal section of the locking mechanism, and Figs. 3 and 4 are detailed views.

In the drawings, A represents the brake-bar, which is secured in the guides $a$, in which it is adapted to slide, to any suitable portion of the gear of the front wheels, in the rear thereof, in a manner to turn with the said wheels, so that the relative positions of the brake-shoes and the tires may be maintained. To the front of this bar A, I secure a flat spring, B, which is secured in place by a bolt passing through its center. The ends of this spring are bent forward, and bear against the front portion of the guides, and their constant tendency is to force the bar toward the rear of the wheels and away from the wheels. The connection between the bar A and the operating-lever C is effected by means of the arms $b$, which are preferably bent into a shape to conform with that of the portion of the gear under which they extend, the levers D and the links E. The levers D are pivoted in the forward end of a plate, $e$, which is secured to the under part of the tongue, and forms the bearing for the nut on the screw-threaded end of the Y-shaped bearing $c$, supporting the lever C. The lower ends of the levers are connected by a bolt, which passes through eyes in the ends of the connecting-rods $b$. The links E form the connection between the levers D and the operating-lever. These links are secured one on each side of the lever by a bolt, $d$, at their upper ends, and they are provided with a circular opening at their lower ends, through which passes a pin, $e'$, connecting the upper ends of the levers D. The pawl F, which engages with a ratchet on the tongue, is supported by the pin $e'$, which passes through it. The pawl is provided with an enlarged head rounded, and which is notched to engage with a cross-pin, $f$, connecting links. The size of the openings in the lower portions of the links is such as to allow the lower end of the pawl to bear on the ratchet-plate without bringing its upper notched end into contact with the pin $f$ when the operating-lever and consequently the links are raised. When the lever is relieved after the brakes are put on, its weight causes the links to drop and bring the pin under the ratch, so that when the lever is slightly raised from the point at which it has been locked the pin engages with the ratch in the pawl and raises the said pawl out of engagement with the ratched teeth. When this is done, the bearing of the pin is on the upper back portion of the circular opening in the links, and the resiliency of the spring and the weight of the lever D coact to bring the said bearing to the lower portion of the curved face. This of course lowers the rear end of the pawl, which is fulcrumed on the pin $f$, and consequently raises the forward end of the pawl sufficiently to allow it to be lowered clear of the ratchet-plate. The ratchet-plate is preferably provided with two vertical flanges, which guide the pawl, and between which the said pawl rests when the brake is not in use. The rear portions are provided with notches, which form seats for the links, and hold them slightly above the level of the ratchet, so that when the lever is lowered the said links are retained in a slightly elevated position while the levers D and the pawl continue their descent and relieve the latter from engagement with the pin.

Although I have shown and described my invention particularly in connection with the front wheels of a wagon or carriage, it will be obvious that by slight modifications it may be applied to the rear wheels, and also that the automatic catch may be applied with equal effectiveness to railway-cars, mills, and the like; and I consider all such applications within the scope of my invention.

Having thus described my invention, what I claim is—

1. The combination, with the lever C, of the links E, constructed substantially as described, and the pawl F.

2. The combination, with the operating-lever C, of the links E, having the pin $f$, and circular openings near their lower ends, and the pawl F, mounted on the pin $e'$, having its bearing in said openings, substantially as described.

3. The combination, with the cross-bar A, mounted in hangers, and the spring B, of the connections B and $d$, operating-lever, and pawl, the whole operating substantially as described.

4. The combination, with the brake-bar, of the spring B, connecting-rods $b$, levers D, links E, and operating-lever C, the said links being provided with the connecting-pin $f$, and having circular openings for the reception of the pin carrying the notched pawl F, substantially as described.

In testimony whereof I have hereunto set my hand in the presence of two subscribing witnesses.

WARREN S. SMITH.

Witnesses:
E. DIETRICH,
ISAAC DERNBERGER.